US012705825B2

(12) United States Patent
Zhang et al.

(10) Patent No.: US 12,705,825 B2
(45) Date of Patent: Aug. 11, 2026

(54) VOLUMETRIC RE-LIGHTING OF 3D OBJECTS

(71) Applicant: Adobe Inc., San Jose, CA (US)

(72) Inventors: He Zhang, Santa Clara, CA (US); Zhixin Shu, San Jose, CA (US); Yiqun Mei, Baltimore, MD (US); Xuaner Zhang, Cupertino, CA (US); Sai Bi, San Jose, CA (US); Jianming Zhang, Campbell, CA (US)

(73) Assignee: Adobe Inc., San Jose, CA (US)

( * ) Notice: Subject to any disclaimer, the term of this patent is extended or adjusted under 35 U.S.C. 154(b) by 141 days.

(21) Appl. No.: 18/889,075

(22) Filed: Sep. 18, 2024

(65) Prior Publication Data

US 2026/0080609 A1 Mar. 19, 2026

(51) Int. Cl.

*G06T 7/70* (2017.01)
*G06T 15/04* (2011.01)
*G06T 15/50* (2011.01)

(52) U.S. Cl.

CPC .............. *G06T 15/506* (2013.01); *G06T 7/70* (2017.01); *G06T 15/04* (2013.01);
(Continued)

(58) Field of Classification Search

CPC .... G06N 3/045; G06N 3/0464; G06N 3/0475; G06T 7/70; G06T 15/04; G06T 15/506;
(Continued)

(56) References Cited

U.S. PATENT DOCUMENTS 11,670,042 B2 * 6/2023 Boubekeur ............. G06T 11/10 345/426
11,704,865 B2 * 7/2023 Villegas ................ G06T 15/506 345/426

(Continued)

OTHER PUBLICATIONS

Poly Haven, Available online at: https://polyhaven.com/, Accessed from Internet on Aug. 16, 2024, pp. 1-14.

(Continued)

*Primary Examiner* — Jacinta M Crawford
(74) *Attorney, Agent, or Firm* — Kilpatrick Townsend & Stockton LLP

(57) ABSTRACT

Techniques for volumetric re-lighting of 3D objects are disclosed. In an example method, a computing system receives a first image of a three-dimensional ("3D") object. The computing system generates a de-lighted image of the 3D object based on the first image. The computing system generates an embedded representation of the 3D object based on the de-lighted image and a first representation of the de-lighted image based on the embedded representation using a first machine learning ("ML") model. The computing system generates a second representation of the 3D object using a second ML model based on orientation and lighting information and one or more internal states of the first ML model. The computing system generates a third representation of the 3D object by combining the first and second representations. The computing system renders a second image of the 3D object based on the third representation of the 3D object.

20 Claims, 9 Drawing Sheets

(52) U.S. Cl.
CPC ..................... *G06T 2200/04* (2013.01); *G06T 2207/20081* (2013.01); *G06T 2207/20084* (2013.01); *G06T 2207/30201* (2013.01); *G06T 2215/12* (2013.01)

(58) Field of Classification Search
CPC . G06T 15/80; G06T 2215/12; G06T 2200/04; G06T 2207/20081; G06T 2007/20084; G06T 2207/30201
USPC .......................................................... 345/426
See application file for complete search history.

(56) References Cited

U.S. PATENT DOCUMENTS

2021/0295571 A1* 9/2021 Sun ......................... G06T 11/00
2022/0157014 A1* 5/2022 Sevastopolskiy ...... G06N 3/084
2025/0259346 A1* 8/2025 Kim ........................ G06T 11/10

OTHER PUBLICATIONS

Barron et al., Shape, Illumination, and Reflectance from Shading, Institute of Electrical and Electronics Engineers Transactions on Pattern Analysis and Machine Intelligence, vol. 37, No. 8, Dec. 4, 2014, pp. 1-19.
Bhattarai et al., TriPlaneNet: An Encoder for EG3D Inversion, Winter Conference on Applications of Computer Vision, 2024, pp. 3055-3065.
Bi et al., Deep Relightable Appearance Models for Animatable Faces, Association for Computing Machinery Transactions on Graphics, vol. 40, No. 4, Aug. 2021, pp. 89:1-89:15.
Blanz et al., A Morphable Model for the Synthesis of 3D Faces, In Seminal Graphics Papers: Pushing the Boundaries, vol. 2, 2023, 8 pages.
Brock et al., Large Scale GAN Training for High Fidelity Natural Image Synthesis, In International Conference on Learning Representations Available Online at: https://arxiv.org/pdf/1809.11096.pdf&org=deepmind, Feb. 25, 2019, pp. 1-35.
Chan et al., Efficient Geometry-aware 3D Generative Adversarial Networks, Computer Vision and Pattern Recognition, Apr. 27, 2022, pp. 1-27.
Chan et al., pi-GAN: Periodic Implicit Generative Adversarial Networks for 3D-Aware Image Synthesis, Computer Vision and Pattern Recognition, Available online at: https://arxiv.org/pdf/2012.00926.pdf, Apr. 5, 2021, 16 pages.
Chen et al., Learning Implicit Fields for Generative Shape Modeling, In Proceedings of the Institute of Electrical and Electronics Engineers/CVF Conference on Computer Vision and Pattern Recognition, Available online at: https://arxiv.org/pdf/1812.02822.pdf, Sep. 16, 2019, 10 pages.
Daras et al., Intermediate Layer Optimization for Inverse Problems Using Deep Generative Models, Available online at: https://arxiv.org/pdf/2102.07364, Feb. 15, 2021, 21 pages.
Debevec et al., Acquiring the Reflectance Field of a Human Face, In Proceedings of the 27th annual conference on Computer graphics and interactive techniques, 2000, pp. 1-12.
Deng et al., Accurate 3D Face Reconstruction with Weakly-Supervised Learning: From Single Image to Image Set, In Proceedings of the Institute of Electrical and Electronics Engineers/CVF conference on computer vision and pattern recognition workshops, 2019, 11 pages.
Deng et al., GRAM: Generative Radiance Manifolds for 3D-Aware Image Generation, In Proceedings of the Institute of Electrical and Electronics Engineers/CVF conference on computer vision and pattern recognition, 2022, pp. 10673-10683.
Deng et al., LumiGAN: Unconditional Generation of Relightable 3D Human Faces, In 2024 International Conference on 3D Vision (3DV), Available online at: https://arxiv.org/pdf/2304.13153, Apr. 25, 2023, pp. 302-312.
Feng et al., Learning an Animatable Detailed 3D Face Model from in-the-Wild Images, Association for Computing Machinery Transactions on Graphics, vol. 40, No. 4, Aug. 2021, pp. 88:2-88-13.
Goodfellow et al., Generative Adversarial Networks, Communications of the Association for Computing Machinery, vol. 63, No. 11, Available online at: https://dl.acm.org/doi/pdf/10.1145/3422622, Nov. 2020, pp. 139-144.
Green, Spherical Harmonic Lighting: The Gritty Details, In Archives of the Game Developers Conference, vol. 56, No. 4, Jan. 16, 2003, pp. 1-47.
Grey, Master Lighting Guide for Portrait Photographers, Amherst Media, 2014, pp. 1-130.
Gu et al., StyleNeRF: A Style-based 3D Aware Generator for High-Resolution Image Synthesis, In International Conference on Learning Representations, Available online at: https://arxiv.org/pdf/2110.08985, Oct. 18, 2021, pp. 1-24.
Guo et al., The Relightables: Volumetric Performance Capture of Humans with Realistic Relighting, Association for Computing Machinery Transactions on Graphics, vol. 38, No. 6, Nov. 8, 2019, pp. 1-19.
Henderson et al., Leveraging 2D Data to Learn Textured 3D Mesh Generation, In Proceedings of the Institute of Electrical and Electronics Engineers/CVF Conference on Computer Vision and Pattern Recognition, 2020, pp. 7498-7507.
Henzler, Escaping Plato's Cave: 3D Shape From Adversarial Rendering, International Conference on Computer Vision, Oct. 2019, pp. 9984-9993.
Hou et al., Face Relighting with Geometrically Consistent Shadows, In Conference on Computer Vision and Pattern Recognition, 2022, pp. 4217-4226.
Hou et al., Towards High Fidelity Face Relighting with Realistic Shadows, Conference on Computer Vision and Pattern Recognition, 2021, pp. 14719-14728.
Ji et al., Geometry-Aware Single-Image Full-Body Human Relighting, Available online at: https://arxiv.org/pdf/2207.04750, Jul. 12, 2022, pp. 1-24.
Jiang et al., NeRFFacelighting: Implicit and Disentangled Face Lighting Representation Leveraging Generative Prior in Neural Radiance, Association for Computing Machinery Transactions on Graphics, vol. 42, No. 3, Jun. 9, 2023, pp. 35:1-35:18.
Kanazawa et al., Learning Category-Specific Mesh Reconstruction from Image Collections, Proceedings of the European Conference on Computer Vision (ECCV), Mar. 2018, 16 pages.
Karras et al., Analyzing and Improving the Image Quality of StyleGAN, Proceedings of the Institute of Electrical and Electronics Engineers, Conference on Computer Vision and Pattern Recognition, Jun. 14, 2020, pp. 8110-8119.
Ke et al., MODNet: Real-Time Trimap-Free Portrait Matting via Objective Decomposition, In Proceedings of the Association for the Advancement of Artificial Intelligence Conference on Artificial Intelligence, vol. 36, No. 1, Jun. 28, 2022, pp. 1140-1147.
Kingma et al., Adam: A Method for Stochastic Optimization, International Conference on Learning Representations, Conference paper at ICLR 2015, Available Online at: https://arxiv.org/pdf/1412.6980.pdf, Jan. 30, 2017, pp. 1-15.
Le et al., Illumination-Invariant Face Recognition with Deep Relit Face Images, Institute of Electrical and Electronics Engineers Winter Conference on Applications of Computer Vision, Jan. 2019, pp. 2146-2155.
Li et al., Intrinsic Face Image Decomposition with Human Face Priors, European Conference on Computer Vision, Sep. 2014, pp. 218-233.
Ma et al., Rapid Acquisition of Specular and Diffuse Normal Maps From Polarized Spherical Gradient Illumination, Eurographics Symposium on Rendering, Jun. 25, 2007, 12 pages.
Mei et al., LightPainter: Interactive Portrait Relighting with Freehand Scribble, Computer Vision and Pattern Recognition, Mar. 2023, pp. 195-205.
Meka et al., Deep Relightable Textures: Volumetric Performance Capture with Neural Rendering, Association for Computing Machinery Transactions on Graphics, vol. 39, No. 6, Dec. 2020, pp. 259:1-259:21.

(56) References Cited

OTHER PUBLICATIONS

Menon et al., PULSE: Self-Supervised Photo Upsampling via Latent Space Exploration of Generative Models, Available online at: https://arxiv.org/abs/2003.03808, Mar. 8, 2020, pp. 2437-2445.
Mildenhall et al., NeRF: Representing Scenes as Neural Radiance Fields for View Synthesis, Communications of the Association for Computing Machinery, vol. 65, No. 1, Jan. 2022, pp. 99-106.
Nestmeyer et al., Learning Physics-Guided Face Relighting Under Directional Light, Computer Vision and Pattern Recognition, Apr. 19, 2020, pp. 5124-5133.
Nguyen-Phuoc et al., HoloGAN: Unsupervised Learning of 3D Representations from Natural Images, Available online at: https://arxiv.org/pdf/1904.01326.pdf, Oct. 1, 2019, 10 pages.
Niemeyer et al., GIRAFFE: Representing Scenes as Compositional Generative Neural Feature Fields, Available online at: https://arxiv.org/pdf/2011.12100.pdf, Apr. 29, 2021, 12 pages.
Or-El et al., StyleSDF: High-Resolution 3D-Consistent Image and Geometry Generation, Conference on Computer Vision and Pattern Recognition, Mar. 30, 2022, 18 pages.
Pan et al., A Shading-Guided Generative Implicit Model for Shape-Accurate 3D-Aware Image Synthesis, Available online at: https://arxiv.org/pdf/2110.15678, Dec. 8, 2021, pp. 1-18.
Pandey et al., Total Relighting: Learning to Relight Portraits for Background Replacement, Association for Computing Machinery Transactions on Graphics, vol. 40, No. 4, Aug. 2021, pp. 43:1-43:21.
Papantoniou et al., Relightify: Relightable 3D Faces from a Single Image via Diffusion Models, Available online at: https://arxiv.org/pdf/2305.06077, Aug. 22, 2023, pp. 1-15.
Peers et al., Post-production Facial Performance Relighting Using Reflectance Transfer, Association for Computing Machinery Transactions on Graphics, vol. 26, No. 3, Jul. 2007, pp. 52-1:52-10.
Ranjan et al., FaceLit: Neural 3D Relightable Faces, Available online at: https://arxiv.org/pdf/2303.15437, Mar. 27, 2023, 14 pages.
Rao et al., VoRF: Volumetric Relightable Faces, Available online at: https://bmvc2022.mpi-inf.mpg.de/0708.pdf, 2022, pp. 1-14.
Richardson et al., Encoding in Style: a StyleGAN Encoder for Image-to-Image Translation, Conference on Computer Vision and Pattern Recognition, Apr. 21, 2021, 21 pages.
Roich et al., Pivotal Tuning for Latent-based Editing of Real Images, Association for Computing Machinery Transactions on Graphics, vol. 42, No. 1, Aug. 12, 2022, pp. 6:1-6:13.
Ronneberger et al., U-Net: Convolutional Networks for Biomedical Image Segmentation, International Conference on Medical Image Computing and Computer-Assisted Intervention, Available Online at URL: https://arxiv.org/pdf/1505.04597.pdf, May 18, 2015, pp. 234-241.
Schriever et al., Complete Self-instructing Library of Practical Photography: Negative Retouching; Etching and Modeling; Encyclopedic Index, American School of Art and Photography, 1909, 504 pages, Chapter XI, "General Modeling," pp. 89-96.
Schwarz et al., GRAF: Generative Radiance Fields for 3D-Aware Image Synthesis, Advances in Neural Information Processing Systems, Available online at: https://arxiv.org/abs/2007.02442, Mar. 30, 2021, pp. 1-13.
Shahlaei et al., Realistic Inverse Lighting from a Single 2D Image of a Face, Taken Under Unknown and Complex Lighting, 11th Institute of Electrical and Electronics Engineers International Conference and Workshops on Automatic Face and Gesture Recognition (FG), May 2015, 8 pages.
Shashua et al., The Quotient Image: Class-Based Re-Rendering and Recognition with Varying Illuminations, Institute of Electrical and Electronics Engineers Transactions on Pattern Analysis and Machine Intelligence, vol. 23, No. 2, Mar. 2001, pp. 1-12.
Shih et al., Style Transfer for Headshot Portraits, Association for Computing Machinery Transactions Graphics vol. 33, No. 4, Jul. 27, 2014, 14 pages.
Shu et al., Portrait Lighting Transfer Using a Mass Transport Approach, Association for Computing Machinery Transactions on Graphics. vol. 37, No. 4, Oct. 2017, pp. 2:1-2:15.
Simonyan et al., Very Deep Convolutional Networks for Large-Scale Image Recognition, Available online at: https://arxiv.org/abs/1409.1556, Apr. 10, 2015, pp. 1-14.
Sun et al., NeLF: Neural Light-transport Field for Portrait View Synthesis and Relighting, Available Online at: https://arxiv.org/pdf/2107.12351, Jul. 26, 2021, 12 pages.
Sun et al., Single Image Portrait Relighting, Association for Computing Machinery Transactions on Graphics, vol. 38, No. 4, Jul. 2019, pp. 79:1-79:12.
Tan et al., VoLux-GAN: a Generative Model for 3D Face Synthesis with HDRI Relighting, SIGGRAPH '22 Conference Proceedings, Aug. 7-11, 2022, 9 pages.
Tewari et al., Monocular Reconstruction of Neural Face Reflectance Fields, In Proceedings of the Institute of Electrical and Electronics Engineers/CVF Conference on Computer Vision and Pattern Recognition 2021, 2021, pp. 4791-4800.
Wang et al., Free-View Face Relighting Using a Hybrid Parametric Neural Model on a Small-Olat Dataset, International Journal of Computer Vision, vol. 131, No. 3, Jan. 7, 2023, pp. 1002-1021.
Wang et al., Image Quality Assessment: from Error Visibility to Structural Similarity, Institute of Electrical and Electronics Engineers Transactions on Image Processing, vol. 13, No. 4, Apr. 13, 2004, pp. 600-612.
Wang et al., Single Image Portrait Relighting via Explicit Multiple Reflectance Channel Modeling, Association for Computing Machinery Transactions on Graphics, vol. 39, No. 6, Nov. 27, 2020, pp. 220:1-220:13.
Wang et al., Sunstage: Portrait Reconstruction and Relighting Using the Sun as a Light Stage, In Proceedings of the Institute of Electrical and Electronics Engineers/CVF Conference on Computer Vision and Pattern Recognition 2023, 2023, pp. 20792-20802.
Wang et al., Towards Real-world Blind Face Restoration with Generative Facial Prior, In Proceedings of the Institute of Electrical and Electronics Engineers/CVF Conference on Computer Vision and Pattern Recognition 2021, 2021, pp. 9168-9178.
Wenger et al., Performance Relighting and Reflectance Transformation with Time-multiplexed Illumination, Association for Computing Machinery Transactions on Graphics, vol. 24, No. 3, Jul. 1, 2005, pp. 756-764.
Wu et al., A Light CNN for Deep Face Representation with Noisy Labels, Institute of Electrical and Electronics Engineers Transactions on Information Forensics and Security, vol. 13, No. 11, Nov. 2018, pp. 2884-2296.
Xia et al., GAN Inversion: A Survey, arXiv preprint arXiv:2101.05278, Aug. 13, 2021, 21 pages.
Xie et al., High-fidelity 3D Gan Inversion by Pseudo-multi-view Optimization, In proceedings of the Institute of Electrical and Electronics Engineers/CVF Conference on Computer Vision and Pattern Recognition, 2023, pp. 321-331.
Yang et al., 3DHumanGAN: 3D-aware Human Image Generation with 3d Pose Mapping, In proceedings of the Institute of Electrical and Electronics Engineers/CVF International Conference on Computer Vision 2023, 2023, pp. 23008-23019.
Yang et al., GAN Prior Embedded Network for Blind Face Restoration in the Wild, In Proceedings of the Institute of Electrical and Electronics Engineers/CVF Conference on Computer Vision and Pattern Recognition 2021, 2021, pp. 672-681.
Yang et al., Pastiche Master: Exemplar-based High-resolution Portrait Style Transfer, In Proceedings of the Institute of Electrical and Electronics Engineers/CVF Conference on Computer Vision and Pattern Recognition 2022, 2022, pp. 7963-7702.
Yang et al., VToonify: Controllable High-resolution Portrait Video Style Transfer, Association for Computing Machinery Transactions on Graphics, vol. 41, No. 6, Nov. 30, 2022, 15 pages.
Yeh et al., Learning to Relight Portrait Images via a Virtual Light Stage and Synthetic-to-real Adaptation, Association for Computing Machinery Transactions on Graphics, vol. 41, No. 6, Nov. 30, 2022, pp. 1-21.
Yin et al., 3D Gan Inversion with Facial Symmetry Prior, In proceedings of the Institute of Electrical and Electronics Engineers/CVF Conference on Computer Vision and Pattern Recognition 2023, 2023, pp. 342-351.

(56) References Cited

OTHER PUBLICATIONS

Yu et al., Free-Form Image Inpainting with Gated Convolution, Available Online at: https://arxiv.org/pdf/1806.03589.pdf, Oct. 22, 2019, 17 pages.
Yuan et al., Make Encoder Great Again in 3D Gan Inversion Through Geometry and Occlusion-aware Encoding, In proceedings of the Institute of Electrical and Electronics Engineers/CVF International Conference on Computer Vision 2023, 2023, pp. 2437-2447.
Zhang et al., 3D-aware Semantic-guided Generative Model for Human Synthesis, In European Conference on Computer Vision, Oct. 23, 2022, pp. 339-356.
Zhang et al., A Feature-enriched Completely Blind Image Quality Evaluator, Institute of Electrical and Electronics Engineers Transactions on Image Processing, vol. 24, No. 8, Apr. 24, 2015, pp. 1-13.
Zhang et al., Adding Conditional Control to Text-to-image Diffusion Models, In Proceedings of the Institute of Electrical and Electronics Engineers/CVF International Conference on Computer Vision, 2023, pp. 3836-3847.
Zhang et al., Neural Light Transport for Relighting and View Synthesis, Association for Computing Machinery Transactions on Graphics, vol. 40, No. 1, Dec. 2020, 16 pages.
Zhang et al., Neural Video Portrait Relighting in Real-time via Consistency Modeling, In Proceedings of the Institute of Electrical and Electronics Engineers/CVF International Conference on Computer Vision 2021, 2021, pp. 802-812.
Zhang et al., Portrait Shadow Manipulation, Association for Computing Machinery Transactions on Graphics, vol. 39, No. 4, Jul. 2020, pp. 78-1:78-14.
Zhang et al., The Unreasonable Effectiveness of Deep Features as a Perceptual Metric, In Proceedings of the Institute of Electrical and Electronics Engineers Conference on Computer Vision and Pattern Recognition, Jan. 1, 2018, pp. 586-595.
Zhou et al., CIPS-3D: A 3D-Aware Generator of GANs Based on Conditionally-Independent Pixel Synthesis, Available online at: https://arxiv.org/abs/2110.09788, Oct. 19, 2021, pp. 1-10.
Zhou et al., Deep Single-Image Portrait Relighting, Available Online at:https://openaccess.thecvf.com/content_ICCV_2019/papers/Zhou_Deep_Single-Image_Portrait_Relighting_ICCV_2019_paper.pdf, Oct. 27, 2019, pp. 7194-7202.

* cited by examiner 412
410

422
420

432
430

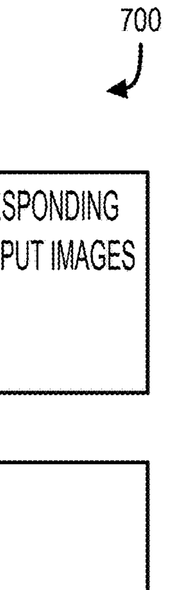

GENERATE TRAINING DATA INCLUDING A NUMBER OF INPUT IMAGES AND CORRESPONDING OUTPUT IMAGES, THE INPUT IMAGES EACH INCLUDING A 3D OBJECT AND THE OUTPUT IMAGES EACH INCLUDING THE 3D OBJECT RELIT AND/OR REORIENTED.
710

FOR EACH INPUT IMAGE, GENERATE A DE-LIGHTED IMAGE.
720

FOR EACH DE-LIGHTED IMAGE, TRANSFER LIGHTING FROM THE CORRESPONDING OUTPUT IMAGE TO THE DE -LIGHTED IMAGE.
730

TRAIN A GAN GENERATOR USING EACH DE-LIGHTED IMAGE AND CORRESPONDING OUTPUT IMAGE.
740

TRAIN A RE-LIGHTING NETWORK USING THE INTERNAL STATES OF THE TRAINED GAN GENERATOR, THE OUTPUT IMAGES, A SET OF ENVIRONMENT MAPS, AND A SET OF ROTATION MATRICES.
750

*FIG. 7*

VOLUMETRIC RE-LIGHTING OF 3D OBJECTS

TECHNICAL FIELD

This disclosure generally relates to three-dimensional ("3D") graphics and photography editing and, more specifically, to systems and methods that enable volumetric re-lighting of 3D objects.

BACKGROUND

Photographers and 3D graphic artists, when capturing or developing an image of a 3D object, may adjust external factors such as lighting conditions, 3D object orientation, or viewpoint to portray the 3D object in a favorable configuration. For example, a photographer may manipulate lighting conditions to highlight the texture and details of the 3D object, creating a more visually appealing image. Similarly, a 3D graphic artist may adjust the object's orientation and viewpoint to enhance its aesthetic appeal and emphasize its most striking features.

Re-lighting of photographed 3D objects can be accomplished by recording detailed lighting information with specialized hardware when the 3D object is first captured and then re-rendering the photo with adjusted lighting conditions using the collected lighting information. Some approaches for re-lighting eliminate the need for hardware by employing computational techniques. For example, the computational techniques include style transfer, which adapts a lighting style from one image to another; quotient image methods, which separate and recombine different aspects of lighting; and intrinsic decomposition, which separates an image into its intrinsic components like reflectance and shading.

SUMMARY

Some embodiments described herein relate to techniques for volumetric re-lighting of 3D objects. In an example method, a computing system receives a first image of a 3D object. The computing system generates a de-lighted image of the 3D object based on the first image. The computing system generates an embedded representation of the 3D object based on the de-lighted image using a first ML model. The computing system generates a first representation of the de-lighted image based on the embedded representation using the first ML model. The computing system generates a second representation of the 3D object using a second ML model based on orientation information about the 3D object and lighting information, in which the second ML model is configured using one or more internal states of the first ML model. The computing system renders a second image of the 3D object based on the third representation of the 3D object.

An example system includes one or more processors and one or more computer-readable storage media storing instructions which, when executed by the one or more processors, cause the one or more processors to perform operations including receiving a first image of a 3D portrait. The operations further include generating a de-lighted image of the 3D portrait based on the first image. The operations further include generating an embedded representation of the 3D portrait based on the de-lighted image using a first ML model. The operations further include generating a first representation representing the de-lighted image based on the embedded representation using the first ML model. The operations further include generating a second representation representing the 3D portrait using a second ML model based on orientation information about the 3D portrait and lighting information, in which the second ML model is configured using one or more internal states of the first ML model. The operations further include generating a third representation representing the 3D portrait by combining the first representation representing the de-lighted image and the second representation representing the 3D portrait. The operations further include rendering a second image of the 3D portrait based on the third representation representing the 3D portrait.

An example non-transitory computer-readable medium stores instructions that, when executed by one or more processors, cause the one or more processors to perform operations including a step for generating a de-lighted image based on an image of a 3D object. The operations further include a step for generating an embedded representation of the 3D object based on the de-lighted image using a first ML model. The operations further include a step for generating a first tri-plane representation of the de-lighted image based on the embedded representation using the first ML model. The operations further include a step for generating a second tri-plane representation of the 3D object using a second ML model based on orientation information about the 3D object and lighting information, in which the second ML model is configured using one or more internal states of the first ML model. The operations further include a step for generating a third tri-plane representation of the 3D object by combining the first tri-plane representation of the de-lighted image and the second tri-plane representation of the 3D object. The operations further include a step for rendering a second image of the 3D object based on the third tri-plane representation of the 3D object.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 7 is a flow diagram of example process for training an ML model for use during volumetric re-lighting of 3D objects, according to some examples of the present disclosure.

DETAILED DESCRIPTION

Figure 1:
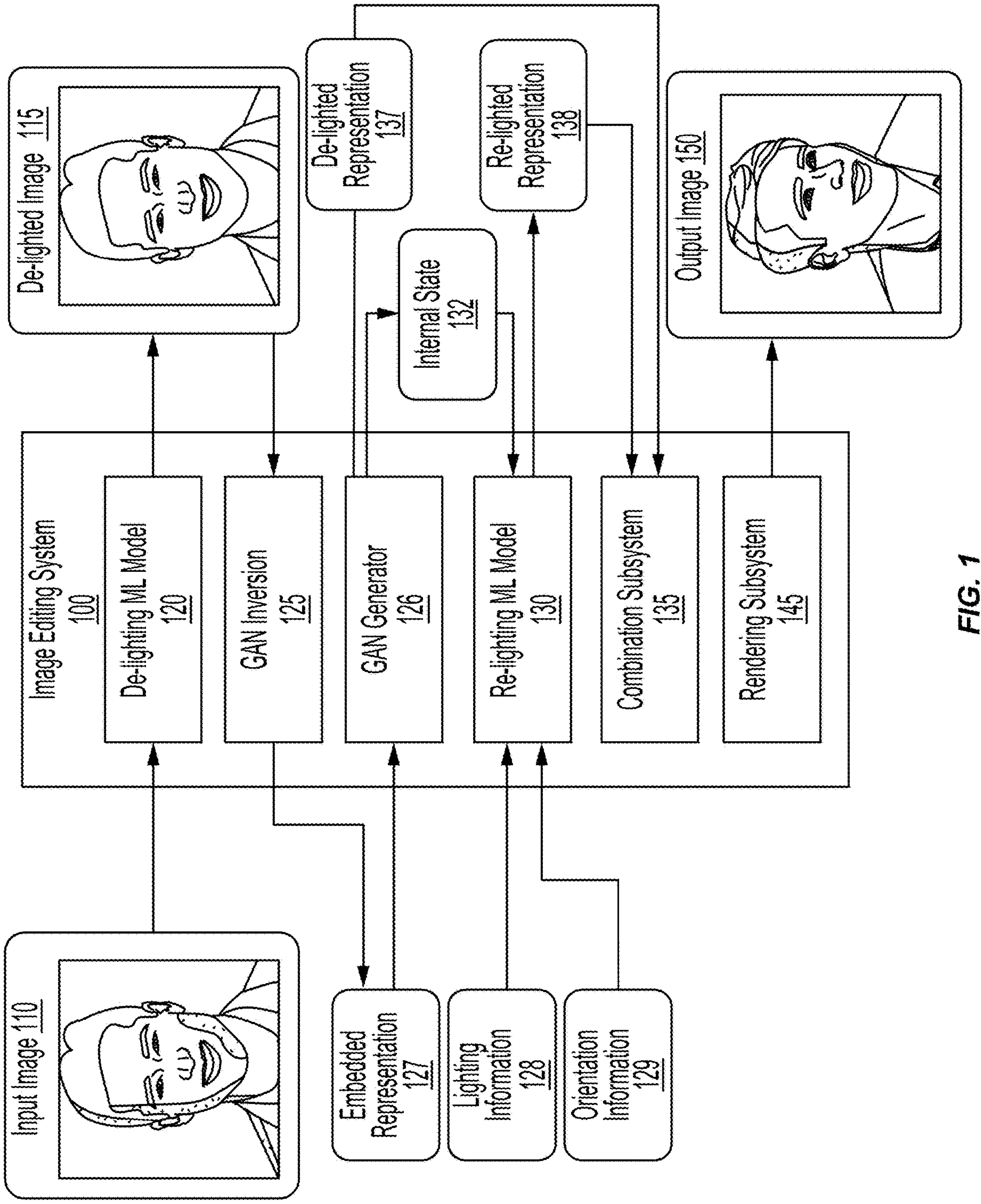
FIG. 1 is a diagram of an example image editing system implementing volumetric re-lighting of 3D objects, according to some examples of the present disclosure.

One challenge in 3D graphics editing and photography is identifying the ideal lighting condition, subject orientation, and viewpoint that best portray the subject. During photographing, for example, configuration of the lighting may be a process that involves tedious adjustments of camera and lighting setup in a professional studio environment with expensive equipment. For some consumer photographers, these hardware elements are prohibitively expensive. Moreover. the high volume of photographs take (e.g., quick selfies or candid photos) mean that few consumer photographers have the time or inclination available to tinker with the lighting configuration to achieve the desired result. Likewise, for 3D graphic artists, determining the optimal lighting and orientation in a digital environment can be equally time-consuming and complex, often requiring sophisticated software, expertise, and multiple time-consuming iterations to achieve the desired visual effects.

In addition to lighting, view synthesis, or generating new perspectives of a subject from different angles based on existing images, is a critical aspect of 3D graphics editing and photography. Editing of the view synthesis can require 3D information about scene captured or depicted in an image. Such information can be obtained in a multi-view setting with specialized acquisition mechanisms. As with the challenges described with respect to lighting, these methods may be less approachable for average users and cannot generally be used in casual contexts, as they are designed for more controlled settings.

While some existing approaches involve re-lighting images of 3D objects, such approaches lack capabilities for simultaneous adjustment of both re-lighting and view synthesis. Precise view and lighting control requires a good estimation of physical properties such as material and geometry. Estimation of such properties given only a monocular (e.g., single image) 2D image can be challenging. Some existing approaches establish the information about the physical properties using explicit physical modeling with simplified assumptions (e.g., simplified reflectance or lighting models) to achieve the desired view and lighting control. Some existing approaches make assumptions about the color of illumination to simplify the physical modeling. These approaches suffer from limited expressiveness and result in producing unrealistic shading effects and less accurate lighting effects.

These challenges are addressed using the techniques for volumetric re-lighting of 3D objects disclosed herein. In an illustrative method, volumetric re-lighting is applied to a photographed portrait of a person (e.g., a "headshot"). A computing system receives an image of a 3D object, in this case, the photo of the person. In some examples, a synthetic 3D rendering of the person could be used to similar effect. The computing system first generates a "de-lighted" image of the person based on the received image. The de-lighted image may be, for instance, an albedo image of the person representing the intrinsic colors of the person without any shading or lighting effects. The de-lighted image can then be used to generate an embedded representation of the 3D object using a machine learning ("ML") model. The embedded representation may be, for example, a high-dimensional vector that encodes various features and characteristics of the 3D object that is suitable for input to subsequent ML models.

The embedded representation is then used to generate a representation of the de-lighted image again using the ML model, in a different mode of operation. The representation of the de-lighted image may be, for example, a "tri-plane" representation that efficiently encodes information about the de-lighted image using three orthogonal planes as an abstraction for a data structure. The internal state of the ML model are then used to configure a second ML model, along with information about the desired orientation and lighting of the 3D object, which generates another representation of the 3D object. A tri-plane representation may again be used here. The representations generated by the two ML models are then combined to generate yet another representation of the 3D object. This combined representation can be used to render an image of the 3D object that reflects the desired orientation and lighting.

The techniques disclosed herein for volumetric re-lighting of 3D objects constitute improvements to the technical field of 3D graphics and photography editing. Current re-lighting methods have restricted flexibility and may produce unrealistic shading and less precise lighting effects. Moreover, existing approaches lack the capability to combine re-lighting with changes in 3D object orientation (e.g., head pose) or point of view (e.g., camera location). Modifying lighting effects, orientation, and point of view are common needs for 3D graphic artists and photographers and yet no technology existed, until now, that can combine these operations with realistic, accurate output and from a single input image, without any additional information. The techniques can significantly reduce the consumption of computational resources through the "one-shot" nature of the editing that is now possible. Existing approaches to editing lighting and orientation may require numerous iterations of trial and error and including the storage of intermediate data. The techniques of this disclosure can generated re-lit and re-oriented images using trained models in a single execution using trained ML models.

Overview

FIG. 1 is a diagram of an example image editing system 100 implementing volumetric re-lighting of 3D objects, according to some examples of the present disclosure. The example system 100 may be a hardware or software component of a computing system such as a laptop computer or mobile device or a combination of such components. In some examples, some components of the system 100 may be a standalone server configured for providing services for volumetric re-lighting of 3D objects using a suitable application programming interface ("API"). Likewise, some components of the system 100 may be hosted in a cloud-computing environment.

The system 100 includes a de-lighting ML model 120 that receives the input image 110 as input. The input image 110 may be identified or selected using a suitable client device executing 3D graphics editing software and output to the system 100. The input image 110 may be, for example, a photograph of a 3D object or a 3D rendering of a 3D object. In some examples, the input image 110 can be a portrait of a person, including an image of the person's head and upper torso. The 3D object (or objects) featured in the input image 110 may have a particular orientation. The orientation may be characterized by an angle with respect to a reference point or by a rotation matrix defining a rotation with respect to a predefined origin and orientation.

The de-lighting ML model 120 is used to generate a de-lighted image 115 of a 3D object included in the input image 110. The de-lighted image 115 may be, for example, an albedo image that shows the 3D object in the input image 110 without any shading or lighting effects. The de-lighting ML model 120 may be one or an ensemble of ML models. For example, the de-lighting ML model 120 may include one or more convolutional neural networks ("CNNs") configured to generate the de-lighted image 115.

The de-lighted image 115 is output to generative adversarial network ("GAN") inversion 125, an ML model configured to map an image back to the latent space of a pretrained generator, sometimes referred to as an embedded representation 127. A GAN, in this context, is an ML model trained to generate 3D images through an adversarial process involving a generator and a discriminator. The generator creates synthetic 3D images, while the discriminator evaluates their realism compared to real 3D images. A feedback mechanism can be employed to iteratively adjust internal parameters of the generator and the discriminator to produce high-quality 3D image synthesis. Various 3D GANs may be used. For example, a pre-trained 3D GAN based on EG3D, developed by Stanford University and NVIDIA may be used. Other examples include StyleGAN3D, a 3D extension of StyleGAN developed by NVIDIA, HoloGAN, or VoxGAN, among others.

GAN inversion 125 is a trained GAN configured to operate in reverse. For example, the generator network of a GAN can be used to determine the input that would produce a particular 3D image, such as the de-lighted image 115. In the input may be an embedded representation 127, such as a multi-dimensional, latent vector that would cause the generator to output de-lighted image 115.

The embedded representation 127 is then input to the GAN generator 126 to generate de-lighted representation 137 of the de-lighted image 115 based on the embedded representation 127. The GAN generator 126 may be, for example, the generator of the GAN used in GAN inversion 125. The de-lighted representation 137 may be an encoded or embedded representation of the de-lighted image 115 such as a tri-plane representation, a voxel grid, a point cloud, a neural radiance field ("NeRF"), a mesh representation, an implicit neural representation, and so on.

Re-lighting model 130 receives lighting information 128 and orientation information 129. The re-lighting model 130 can be conditioned on a representation of the desired lighting, orientation, or point of view with respect to the 3D object and augmented with the 3D-aware features of the image of the 3D object encoded in the internal state 132 of the GAN generator 126. For example, the lighting information 128 may be an environment map corresponding to a 360° depicting of the location and intensity of light sources with respect to the 3D object. The orientation information 129 may be, for example, a rotation matrix defining a rotation with respect to a predefined origin and orientation.

In some examples, the re-lighting model 130 may include a number of CNN layers. Following generation of the de-lighted representation 137, the internal state 132 of the GAN generator 126 is extracted and combined with the input of the re-lighting model 130 or with the internal state of the re-lighting model 13. For example, the internal state 132 of the GAN generator 126 may be the output of the internal layers of the GAN generator 126, sometimes referred to as intermediate features or activations. The layered re-lighting model 130 likewise may include a number of intermediate features or activations. The internal state 132 may be combined (e.g., concatenated) with the internal state of the re-lighting model 130.

The re-lighting model 130 generates a re-lighted representation 138 of the 3D object based on the lighting information 128 and orientation information 129 and using the internal state 132. The re-lighted representation 138 may again be a tri-plane representation or other suitable representation.

The system 100 includes combination subsystem 135 that combines the de-lighted representation 137 and the re-lighted representation 138. For example, tri-plane de-lighted and re-lighted representations 137, 138 can be added to generate another tri-plane representation of the 3D object. The rendering subsystem 145 then renders the re-lighted and/or re-oriented image of the 3D object based on the combined representation to produce output image 150.

Method for Volumetric Re-Lighting of 3D Objects

Figure 2:
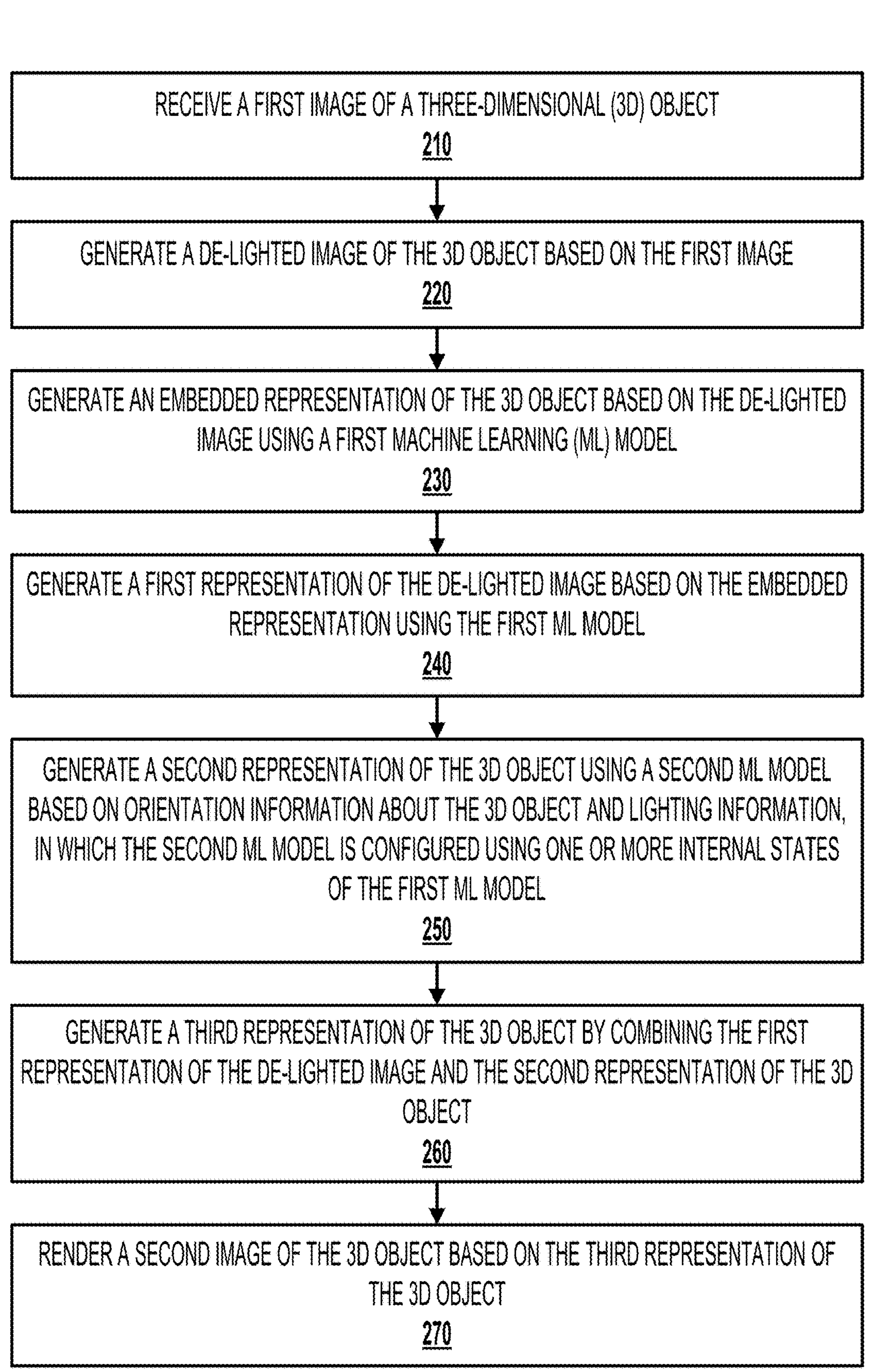
FIG. 2 is a flow diagram of an example process for volumetric re-lighting of 3D objects, according to some examples of the present disclosure.

FIG. 2 is a flow diagram of an example process 200 for volumetric re-lighting of 3D objects, according to some examples of the present disclosure. The process 200 depicted in FIG. 2 may be implemented in software executed by one or more processing units of a processing device, implemented in hardware, or implemented as a combination of software and hardware. This process 200 is intended to be illustrative and non-limiting. The example process herein is described with reference to the example image editing system 100 depicted in FIG. 1, but other implementations are possible. Although FIG. 2 depicts various processing operations occurring in a particular order, the particular order depicted is not required. In certain alternative embodiments, the processing may be performed in a different order, some operations may be performed in parallel, or operations may be added, removed, or combined together.

At block 210, a computing system receives a first image of a 3D object. For example, the first image may be a photograph of a 3D object or a rendered image of a 3D object. The 3D object may be, for example, a "portrait" of a living subject such as a human or an animal (e.g., a pet). In other examples, the 3D object can be a photograph or rendering of any lighted object in 3D space (e.g., car, palm tree, planet, etc.). The first image may be characterized by a particular lighting configuration, orientation, or point of view. One, two, or all three of these properties can be edited using the techniques described herein using only the single first image.

At block 220, the computing system generates a de-lighted image of the 3D object based on the first image. The de-lighted image may be, for example, an albedo image. An albedo image is a representation of the intrinsic color of surfaces in a scene without lighting or shading effects that captures only the diffuse reflection of light. The albedo image can be predicted using one or more ML models. In some examples, the albedo image can be generated using two ML models. A first de-lighting model may be trained to predict a "normal" image given the first image as input. The normal image may include pixel values that represent the orientation of the surface at each point. A second de-lighting model can be trained to predict the albedo image conditioned on both the inferred normal image and the first image.

The first and second de-lighting models can be any suitable ML model optimized for image processing tasks. The first and second de-lighting models may be, for example, convolutional neural networks ("CNNs"). In some examples, one or both of the de-lighting models may be CNNs with a U-Net architecture. The U-Net architecture is an example of a CNN with a U-shaped structure that includes an encoder for context capture and a symmetric decoder for precise localization. In some examples, the U-Net based de-lighting models may include three down-sampling layers and/or three up-sampling layers. For example, one or both of the de-lighting models may include successive layers hidden channels or feature maps numbering 64-128-256-512-256-128-64, respectively. Other ML models that may be used for de-lighting include other families of neural networks, generative adversarial networks ("GANs"), autoencoders, transformers, and so on.

At block 230, the computing system generates an embedded representation of the 3D object based on the de-lighted image using a first ML model. The first ML model may be, for instance, a GAN. A GAN is a type of ML model that includes a number of neural networks such as a generator neural network that generates synthetic images from latent vectors, and a discriminator neural network, which evaluates the realism of these generated synthetic images against real images. The GAN generator outputs the generated images using any suitable format for processing by the discriminator. For example, the GAN generator may be a tri-plane generator configured to output the generated synthetic images using a compact tri-plane representation for efficient processing. Tri-plane representations involve encoding the 3D information implicitly included in the image by projecting the information onto three orthogonal planes. Detailed examples of tri-plane representations are shown below in FIG. 6. Other implementations of the first ML model may include variational autoencoders (VAEs), Neural Radiance Fields (NeRFs), implicit neural representations, convolutional neural networks (CNNs), and so on.

The de-lighted image can be "lifted" into 3D space by projecting it through the latent space of a GAN configured for 3D-aware image synthesis. In this respect, projecting the image through the latent space can refer to identifying a point in the multi-dimensional latent space of the GAN that, when passed through the generator network of the GAN, produces an image similar to the input. This process may be referred to as "GAN inversion" or a GAN inversion operation.

Given a de-lighted image $\mathcal{A}$ and a pretrained GAN $\mathcal{G}$ that is parameterized by θ, GAN inversion involves determining an embedded representation w* of the image $\mathcal{A}$ and fine-tuning the GAN $\mathcal{G}$ to best reconstruct $\mathcal{A}$. Formally, this operation can be described as determining the w*,θ* for the GAN generator that minimize the reconstruction loss, or $$w^*, \theta^* = \underset{w,\theta}{\operatorname{argmin}}\, \mathcal{L}_{inv}(G(w;\theta), \mathcal{A})$$

where G(w;θ) is the generated image for a particular input w and weights θ. In some examples, during this optimization process, the parameters of the GAN generator θ may be updated while the parameters of other GAN components (e.g., the GAN discriminator) may be maintained constant.

At block 240, the computing system generates a first representation of the de-lighted image based on the embedded representation using the first ML model. In examples in which the first ML model is a GAN, the GAN generator may output a tri-plane representation of the de-lighted image given the latent vector w* as input.

The GAN generator (or other ML model) may be a neural network with a number of layers having corresponding internal states. The outputs of the layers of the GAN generator can be referred to as the intermediate features or activations produced by the GAN generator as it processes input latent vectors, such as w or the optimized w*. The intermediate features of the GAN generator as it processes the optimized w* may thus encode details about the generated representation or image, such as edges, textures, 3D spatial structure, and so on. These internal states may be extracted from the first ML model following determination of w*,θ* and used to configure other ML models, as described below with respect to block 250 and in FIG. 3.

At block 250, the computing system generates a second representation of the 3D object using a second ML model based on orientation information about the 3D object and lighting information, in which the second ML model is configured using one or more internal states of the first ML model. For example, the second ML model may include a number of CNN layers that extract the 3D information contributed by the orientation information about the 3D object and the lighting information. The internal states of the first ML model can be combined with these inputs (e.g., using concatenation). Consequently, the second representation output by the second ML model combines (e.g., through convolution) elements of the orientation information about the 3D object, the lighting information, and the internal states to generate encoded featured of the desired 3D edits such as complex non-Lambertian reflections and cast shadows without using any physical lighting priors.

At block 260, the computing system generates a third representation of the 3D object by combining the first representation of the de-lighted image and the second representation of the 3D object. For example, the first and second tri-plane representations can be added to generate the third representation. Other operations, such as multiplication, concatenation, a weighted sum, or other operations may be similarly used to generate the third representation.

At block 270, the computing system renders a second image of the 3D object based on the third representation of the 3D object. For example, for a third tri-plane representation, the relit and/or reoriented image can be rendered using volume rendering techniques. For instance, a ray-tracing approach in which 3D points along each ray can be sampled and projected onto each of the three orthogonal planes of the third tri-plane representation to retrieve a summed 1D feature can be used. The summed 1D feature may include, for example, a color feature c and a density σ. The color feature c and a density σ can be decoded using an ML model such as a multi-layer perceptron ("MLP"). A multichannel image $I_c$ can then be generated using volume rendering. For example, the multichannel image $I_c$ may be given by $$I_c(r) = \int_{t_n}^{t_f} T(t)\cdot\sigma(t)\cdot c(i)dt$$

where $t \in [t_n, t_f]$ are sampled 3D points along the ray and $$T(t) = \exp\left(-\int_{t_n}^{t} \sigma(s)ds\right)$$

is the transmittance representing the accumulated opacity up to t. In some examples, the multichannel image may be accumulated at low resolution and upsampled to the final high-resolution image using an ML model trained for super-resolution applications.

Figure 3:
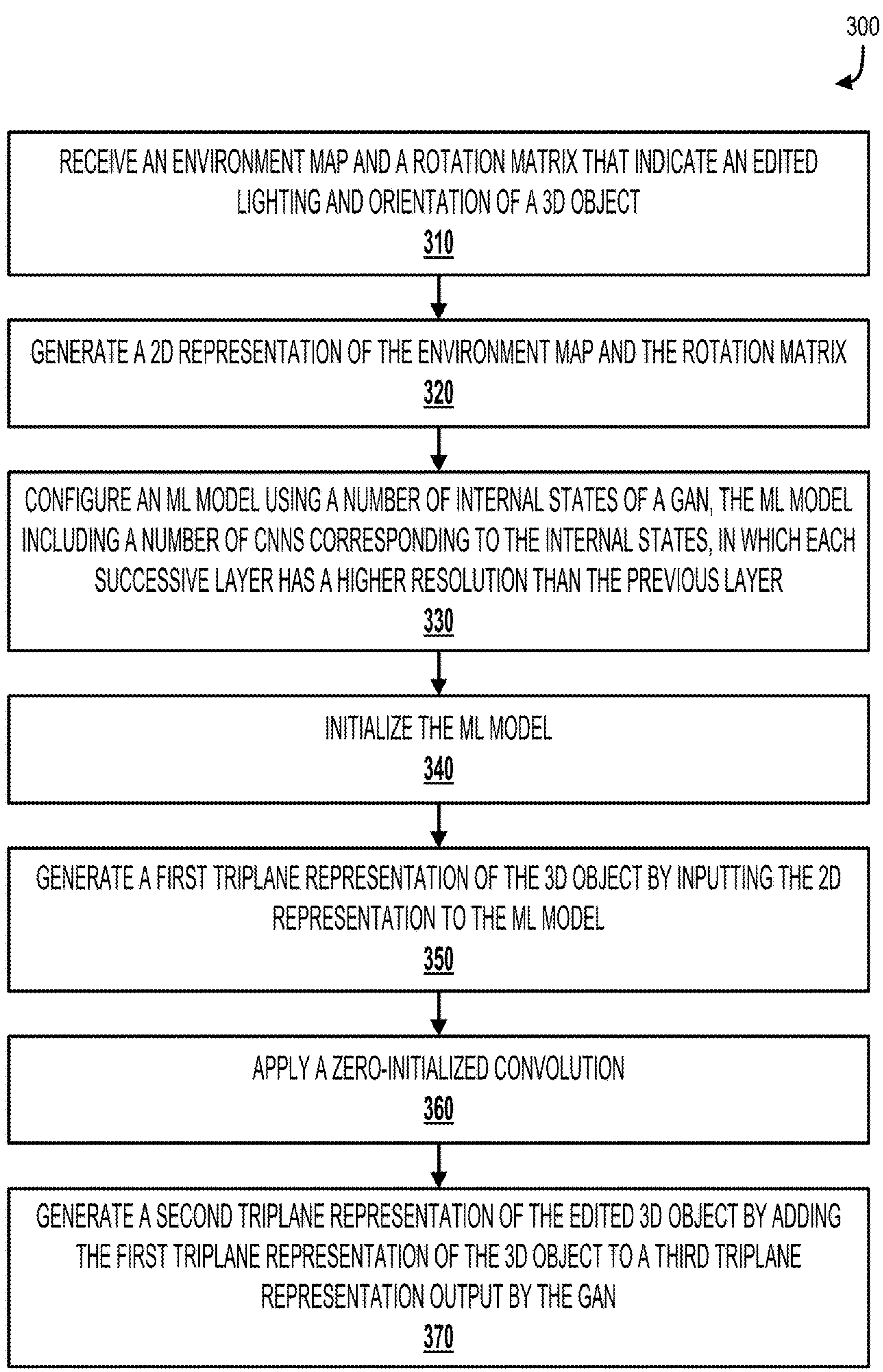
FIG. 3 is a flow diagram of another example process for volumetric re-lighting of 3D objects, according to some examples of the present disclosure.

FIG. 3 is a flow diagram of another example process 300 for volumetric re-lighting of 3D objects, according to some examples of the present disclosure. Process 300 includes a more detailed example implementation of block 250 in FIG. 2 above. The process 300 depicted in FIG. 3 may be implemented in software executed by one or more processing units of a processing device, implemented in hardware, or implemented as a combination of software and hardware. This process 300 is intended to be illustrative and non-limiting. The example process herein is described with reference to the example image editing system 100 depicted in FIG. 1, but other implementations are possible. Although FIG. 3 depicts various processing operations occurring in a particular order, the particular order depicted is not required. In certain alternative embodiments, the processing may be performed in a different order, some operations may be performed in parallel, or operations may be added, removed, or combined together.

At block 310, a computing system receives an environment map and a rotation matrix that indicate an edited lighting and orientation of a 3D object. The orientation of the 3D object (e.g., the head pose of a portrait) may be indicated, for example, using a 3×3 rotation matrix. The rotation matrix can describe the orientation of the 3D object with respect to a predetermined 3D coordinate system.

Figures 4A, 4B, 4C:
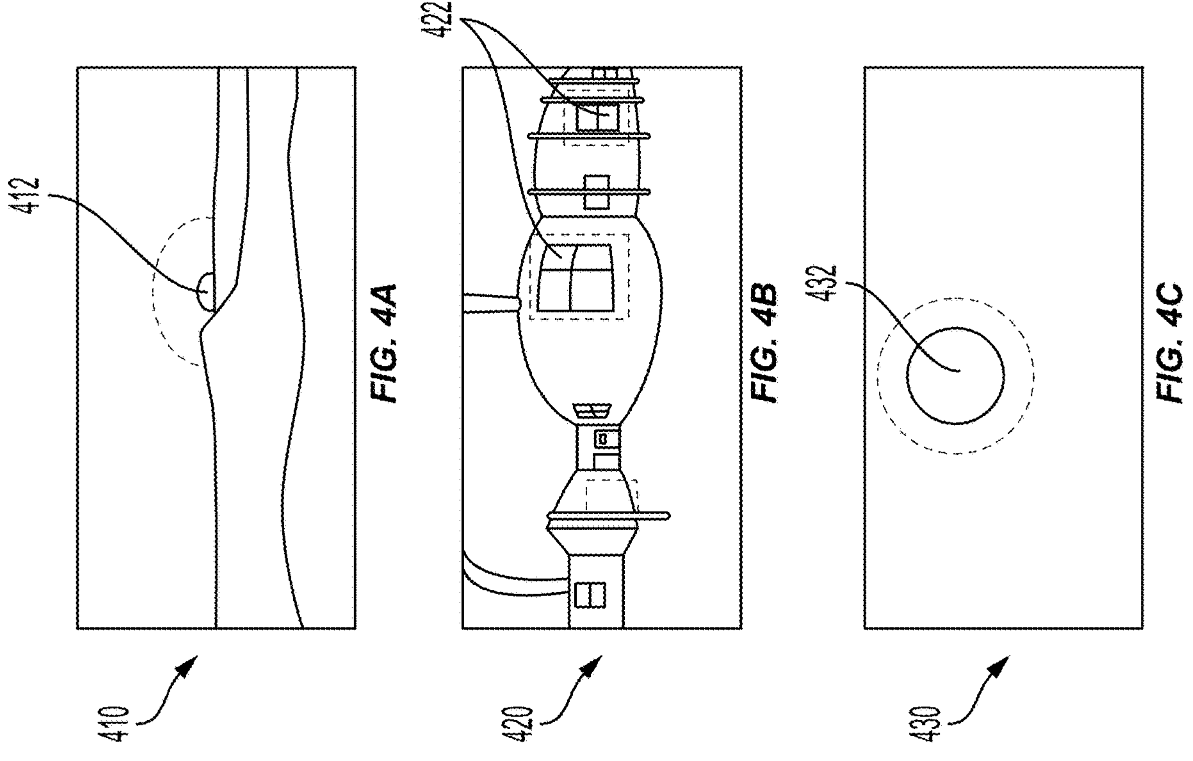
FIGS. 4A-4C show example environment maps that can be used for volumetric re-lighting of 3D objects, according to some examples of the present disclosure.

The environment map can indicate the desired lighting condition. The environment map may be, for example, a 360° panoramic image depicting the desired lighting condition. FIGS. 4A-4C show example environment maps that can be used for volumetric re-lighting of 3D objects, according to some examples of the present disclosure. FIG. 4A shows landscape 410 that includes natural light source 412. FIG. 4B shows indoor panorama 420 that includes light sources 422. In landscape 410 and indoor panorama 420, the respective light sources 412, 422 are indicated using colors. For instance, pure white pixels may correspond to a bright light source while pure black pixels may correspond to an absence of a light source. FIG. 4C shows artificial panorama 430 including point light source 432. Environment maps such as artificial panorama 430 can be used to apply photographic effects such as shadow diffusion or softening using the techniques of this disclosure.

At block 320, the computing system generates a 2D representation of the environment map and the rotation matrix. For example, the environment map and a rotation matrix may be reshaped into 1D tensors and then tiled to 2D maps. For example, the environment map can be flattened row by row or column by column into a continuous sequence. The matrix elements of the rotation matrix can likewise be flattened row-wise or column-wise into a single vector. The two 1D tensors can be concatenated to form a single 1D tensor (e.g., an array). The 1D tensor can be "tiled" or repeated to generate the 2D representation. The 2D representation may have a resolution that conforms to the dimensions of the first layer of the re-lighting ML model, described below.

At block 330, the computing system configures an ML model using a number of internal states of a GAN, the ML model including a number of CNNs corresponding to the internal states, in which each successive layer has a higher resolution than the previous layer. For example, the ML model can be based on a pyramidal structure with a progressively increasing its spatial resolution to match the resolution of the respective internal states of the GAN (e.g., the GAN tri-plane generator). Following each resolution stage, the ML model can concatenate the respective intermediate GAN feature to the activation produced by the resolution stage, the intermediate GAN feature and the activation produced by the resolution stage being configured to have the same resolution. The next resolution stage can then output an upsampled feature for next the resolution stage. The internal states of a GAN can encode the 3D information of the albedo image.

At block 340, the computing system initializes the ML model. For example, the ML model, during training, may diverge under certain circumstances. To stabilize the training of the ML model, a zero-initialized convolution can be applied to the ML model before inference begins. Applying the zero-initialized convolution during training can cause the weights of CNNs in the ML model to be initialized to 0 at the beginning of training and then optimized training. During inference, the learned, optimized weights are used as the CNN kernels. Use of a zero-initialized convolution or other similar strategy during training can allow the ML model to gradually incorporate the illumination signals indicated by the environment map and stabilize training.

Figure 5A:
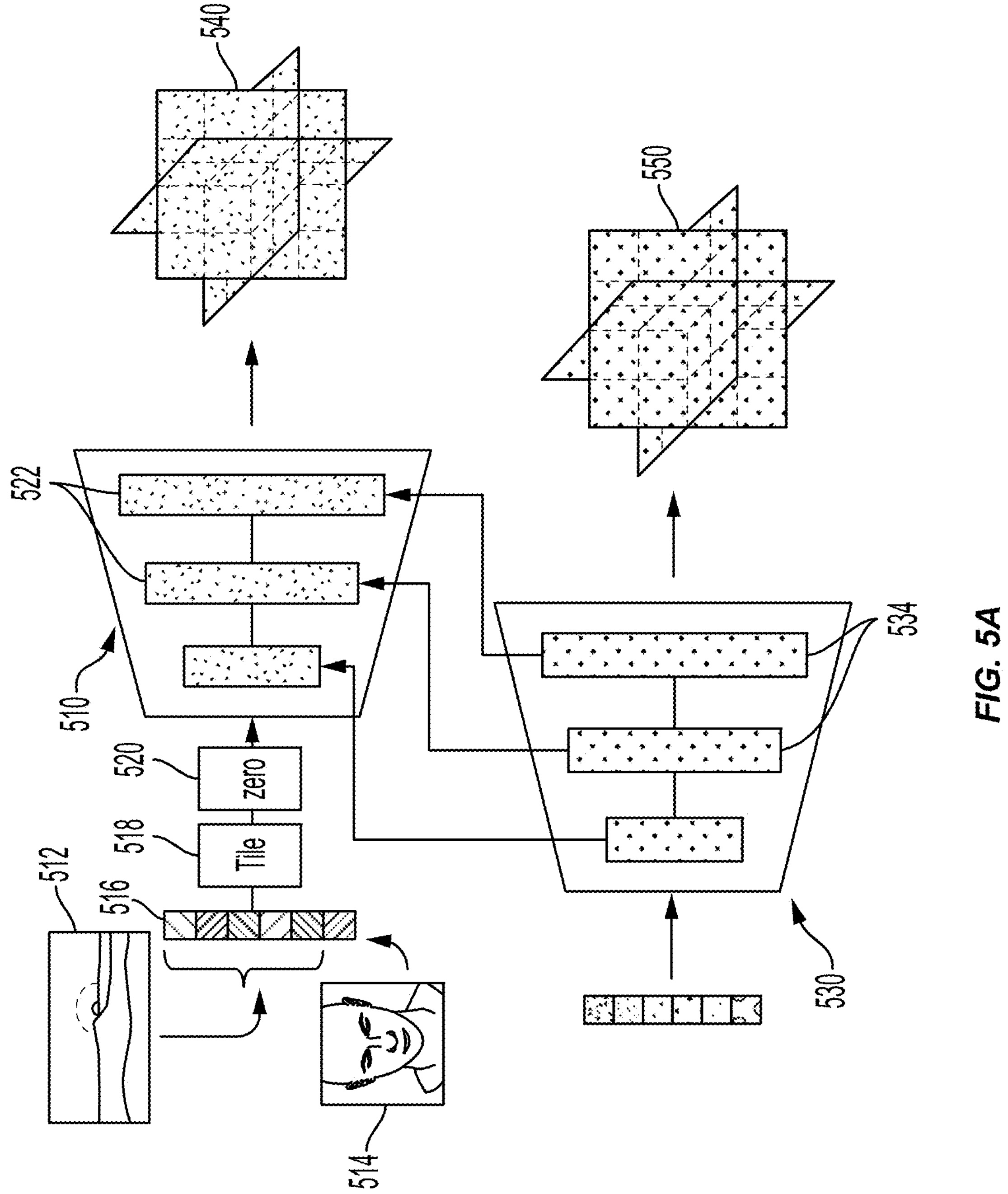
FIGS. 5A and 5B shown an example implementation of an ML model for volumetric re-lighting of 3D objects, according to some examples of the present disclosure
Figure 5B:
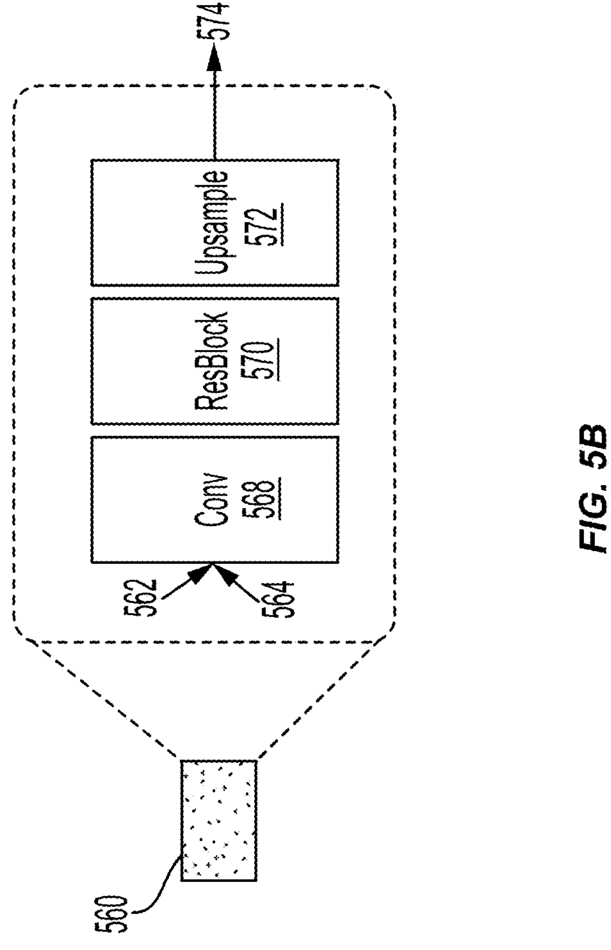

At block 350, the computing system generates a first tri-plane representation of the 3D object by inputting the 2D representation to the ML model. An example implementation of an ML model for re-lighting is shown in FIGS. 5A and 5B, according to some examples of the present disclosure. FIG. 5A shows a GAN generator 530 and an implementation of the ML model described in this process, sometimes referred to as a re-lighting network 510. The internal states of GAN generator 530 corresponding to albedo image tri-plane representation 550 are concatenated with the re-lighting network 510 activations 522, as described in block 340. The activations 522, or feature maps, can be split channel-wise from a single feature map, with each channel corresponding to a separate feature map produced by the style blocks of the GAN generator 530. The style blocks of the GAN generator 530 may be layers that modulate the features of the albedo image tri-plane representation 550 based on embedded style representations that can influence aspects of the image's appearance.

The re-lighting network 510 receives environment map 512 and rotation matrix 514 (illustrated using an example head pose) as input. The re-lighting network 510 reshapes the environment map 512 and rotation matrix 514 into a 1D tensor 516 and then tiles the 1D tensor 516 to generate 2D map 518, as described in block 320. The re-lighting network 510 is initialized using zero-initialized convolution 520. Following inference, the re-lighting network 510 outputs first tri-plane representation 540.

FIG. 5B shows a detail view of a layer 560 of the re-lighting network 510. The layer 560 may be one of a number of layers included in the re-lighting network 510. The layer 560 receives input 564 from the previous layer or initial, zero-initialized input following zero-initialized convolution 520 as shown in FIG. 5A. The input 564 is concatenated with GAN generator intermediate feature 562 (e.g., activation). Each layer 560 or stage of the example re-lighting network 510 includes a convolution layer 568, a residual block 570 ("ResBlock"), and an "upsample" block 572, which is a transposed convolution layer for upsampling (e.g., increasing the resolution of the input). As described above, the re-lighting network 510 can be configured to progressively increasing the spatial resolution following each layer 560. The number of output channels of each layer 560 can be configured to equal the number of channels for the corresponding style block in the GAN generator 530. Output 574 can be input to the next layer or output as a tri-plane representation as shown in FIG. 5A.

At block 360, the computing system applies a zero-initialized convolution to the output of the ML model. For example, the zero-initialized convolution can be directly convolved with a tri-plane representation of the 3D object output by the ML model. The tri-plane representation of the 3D object may be output as a number of 2D feature maps. The 2D feature maps can be concatenated along the channel dimension to generate a single 2D feature map. The channel dimension may refer to the number of feature maps or filters in each CNN layer. The resulting single 2D feature map can be passed to the zero-initialized convolution to process.

At block 370, the computing system generates a second tri-plane representation of the edited 3D object by adding the tri-plane representation of the 3D object to a third tri-plane representation output by the GAN. The second tri-plane representation of the edited 3D object may be, for example, a relit tri-plane representation that has the target illumination, as represented in the environment map, embedded. For example, the first and third tri-planes can be added by combining corresponding feature maps across the three orthogonal planes of each tri-plane representation. For instance, the feature maps may be combined using element-wise addition or other suitable operation. The second tri-plane representation of the edited 3D object can then be rendered using volume rendering.

Figure 6:
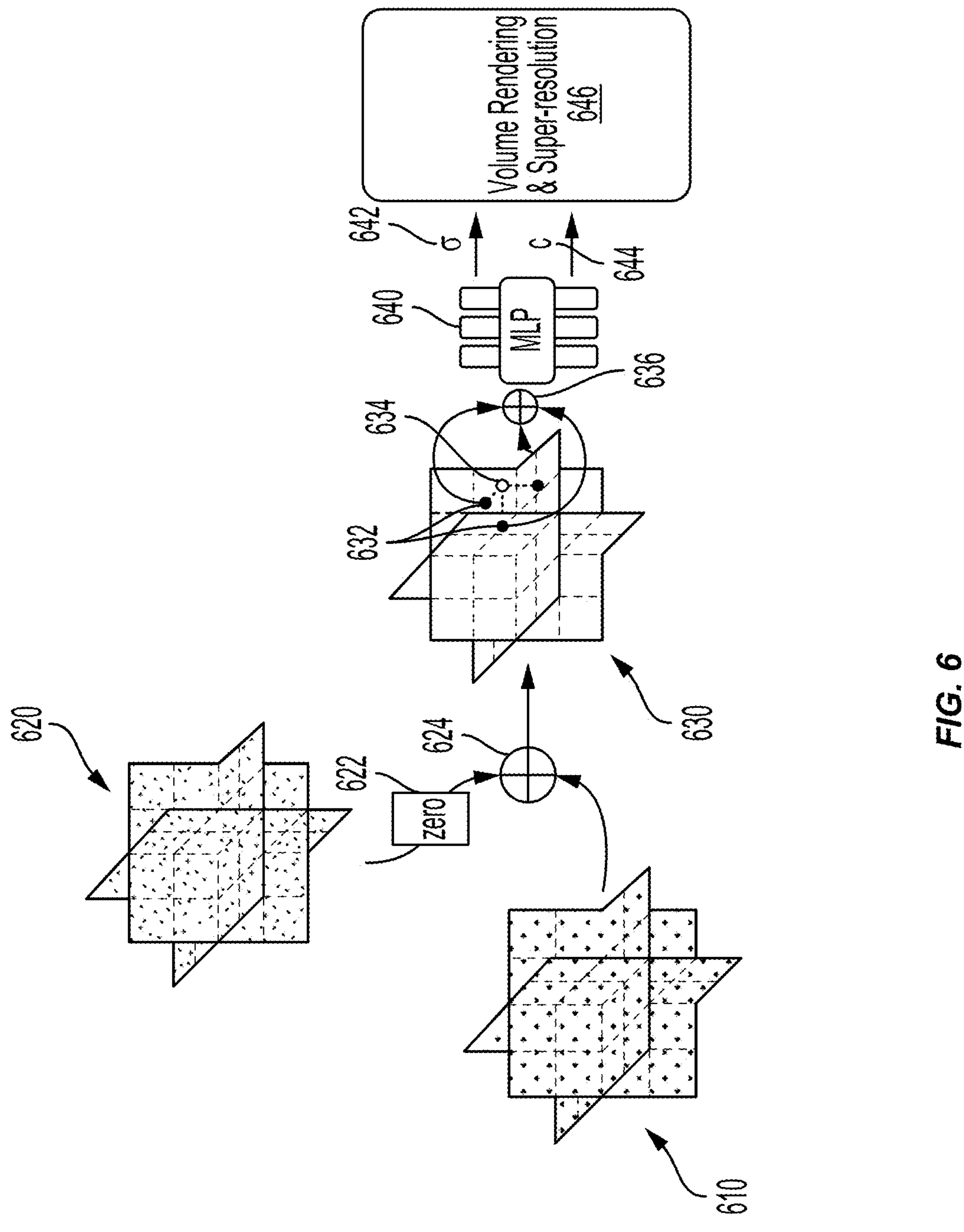
FIG. 6 shows examples of tri-plane representations that can be used for volumetric re-lighting of 3D objects, according to some examples of the present disclosure.

FIG. 6 shows examples of tri-plane representations that can be used for volumetric re-lighting of 3D objects, according to some examples of the present disclosure. FIG. 6 shows first tri-plane representation 620, output from re-lighting network 510 and third tri-plane representation 610 output from GAN generator 530 being combined to obtain second tri-plane representation 630. Prior to the combination, zero-initialized convolution 622 is applied to the first tri-plane representation 620, similar to the operation described in block 360. The combination 624 may be an addition operation, element-wise multiplication, concatenation, a weighted sum, or other suitable combination 624 operation. The combination 624 generates the second tri-plane representation 630.

To convert the second tri-plane representation 630 to a representation that can be rendered, the points of the 3D space of the image can be sampled or "queried" in the 3D coordinate system of the second tri-plane representation 630. Each sampled point 634 in 3D space is be projected onto three corresponding points 632 of the orthogonal planes of the second tri-plane representation 630. Each projected point 632 corresponds to a component of a feature vector associated with the sampled point 634. The projected points 632 are combined 636 using, for instance concatenation or vector addition, to produce a feature representation for the 3D point 634.

This combined 636 feature representation is then input to an ML model such as MLP 640. MLP 640 can be trained to predict color feature c 644 or a density σ 642 for a combined 636 feature representation. The color feature c 644 or a density σ 642 are output to a volume rendering and super-resolution component 646 to be rendered into a relit, reoriented, editing output image. The volume rendering and super-resolution component 646 can be used to first generate a low resolution image using a volume rendering technique and then a high resolution image using a super-resolution neural network.

FIG. 7 is a flow diagram of example process 700 for training an ML model for use during volumetric re-lighting of 3D objects, according to some examples of the present disclosure. The process 700 depicted in FIG. 7 may be implemented in software executed by one or more processing units of a processing device, implemented in hardware, or implemented as a combination of software and hardware. This process 700 is intended to be illustrative and non-limiting. The example process herein is described with reference to the example image editing system 100 depicted in FIG. 1 and components of FIGS. 5A-5B, but other implementations are possible. Although FIG. 7 depicts various processing operations occurring in a particular order, the particular order depicted is not required. In certain alternative embodiments, the processing may be performed in a different order, some operations may be performed in parallel, or operations may be added, removed, or combined together.

At block 710, a computing system generates training data including a number of input images and corresponding output images, the input images each including a 3D object and the output images each including the 3D object relit and/or reoriented. The training data can be generated manually or using purchased or licensed images. In some examples, the training data can be generated using light stage captures to render high quality training datasets. For instance, the training data can be generated using light stage captures which consists of 160 programmable LED lights and 4 frontal-view cameras.

The light stage captures can include subjects photographed with different poses, expressions, and accessories. Using the light stage, a variety of "one-light-at-a-time" ("OLAT") sequences of lighting, re-lighting, and/or reoriented can be generated. For example, for 3D objects that are portraits, subjects with different genders and races can be used. For training of the ML models used for de-lighting, flat images obtained using omnidirectional lighting (e.g., all lights turned on) can be used as "ground-truth" for de-lighted (e.g., albedo) images. A photometric stereo technique can be used to generate normal images used to generate de-lighted images conditioned on normal images. Environment maps used during training can be manually generated, bought, or licensed. Lighting in the input images can be augmented by randomly rotating the environment map and including the original OLAT images in the training dataset. Pairs of input and output images used during training can be randomly paired. For example, pairs of OLAT sequences and environment maps can be randomly paired to create test sets.

At block 720, the computing system, for each input image, generates a de-lighted image. The de-lighted image, for each input image, can be generated substantially as described above in block 220 of FIG. 2.

At block 730, the computing system, for each de-lighted image, transfers lighting from the corresponding output image to the de-lighted image. For example, lighting from the corresponding output image can be transferred to the de-lighted image to improve the level of lighting and shading detail captured by the internal states of the GAN generator 530, as described below in blocks 740 and 750. The lighting from the target OLAT rendering can be transferred to the de-lighted image (e.g., the inverted albedo image) to create a "pseudo ground-truth" re-lighted image.

Formally, given a ground-truth re-lighting image $\mathcal{R}_{gt}$ and an associated albedo image $\mathcal{A}_{gt}$, a decomposition such as a shading image $$S = \frac{\mathcal{R}_{gt}}{\mathcal{A}_{gt}}$$

computed using element-wise division can be determined. The shading $\mathcal{S}$ is then transferred to the albedo image $\mathcal{A}_{gt}$ to generate inverted albedo image $\mathcal{A}_{inv}$. Inverted albedo image $\mathcal{A}_{inv}$ may be, for example, reconstructed from the latent code. Pseudo ground-truth re-lighted image $\tilde{\mathcal{R}}_{gt}$ can then be computed using per-pixel multiplication by shading $\mathcal{S}$. For instance, the pseudo ground-truth re-lighted image can be given by $\tilde{\mathcal{R}}_{gt}=\mathcal{S}\odot\mathcal{A}_{inv}$ where $\odot$ denotes the Hammond product, to produce a pseudo ground-truth image $\tilde{\mathcal{R}}_{gt}$. The Hammond product can involve the element-wise multiplication of two matrices of the same dimension. The pseudo ground-truth re-lighted image can be used for training of the re-lighting network 510 as described below in block 750. For example, for 3D objects that are portraits, the pseudo ground-truth re-lighted image can preserve the target shading while maintaining consistent facial details with the inverted albedo image, and thus is also consistent with the encoded subject appearance in GAN generator 530.

At block 740, the computing system trains the GAN generator 530 using each ed-lighted image and corresponding output image. For example, the modified de-lighted image can be inverted to determine an embedded representation or latent vector using a GAN inversion technique, as described above in block 230 of FIG. 2. The embedded representation of the de-lighted image can be used with labeled output images to train the GAN generator 530 to correctly predict the tri-plane representation output for a given embedded representation input.

Single-view inversion, for example using a GAN inversion technique, of the de-lighted image may suffer from depth ambiguity. In these cases, the incorrectly encoded geometry can prevent the re-lighting network 510 from using accurate 3D-aware features for re-lighting. To address this issue, a multi-view approach based on the multi-view light stage captures described in block 710 can be used.

Formally, given a set of de-lighted (e.g., albedo images) $\mathcal{A}=\{\mathcal{A}^1, \mathcal{A}^2, \ldots, \mathcal{A}^n\}$ captured from N viewpoints and associated camera poses $P=\{p^1, p^2, \ldots, p^n\}$, during training of the GAN generator 530 an optimized w* shared among all $\mathcal{A}$ and per-frame pose P* can be determined, where P* is an optimized version of P. For example, an optimized w* can be determined by minimizing the loss:

$$\mathcal{L}_{w,P}=\frac{1}{n}\sum_{1}^{n}\left\|\phi_{VGG}\left(G\left(w,p^i\right)\right)-\phi_{VGG}\left(\mathcal{A}^i\right)\right\|_2$$

where $\phi_{VGG}$ is a pretrained deep convolutional neural network ("CNN") prepared by the Visual Geometry Group ("VGG"). Following this minimization, the GAN generator 530 can be fine-tuned by optimizing the equation $$\mathcal{L}_{\theta}=\frac{1}{n}\sum_{1}^{n}\left\|G(\theta)-\mathcal{A}^i\right\|_2+\mathcal{L}_{lpips}\left(G(\theta),\mathcal{A}^i\right)$$

where $\mathcal{L}_{lpips}$ is the perceptual loss, which may be a comparison of high-level feature representations of images, to assess the perceptual similarity between generated and target images.

At block 750, the computing system trains a re-lighting network 510 using the internal states of the trained GAN generator, the output images, a set of environment maps, and a set of rotation matrices. The re-lighting network 510 can be trained by minimizing a total loss function given by $\mathcal{L}_{relight}=\mathcal{L}_{R_{relit}}+\mathcal{L}_{P_{relit}}+\mathcal{L}_{A_{relit}}$. The reconstruction loss $\mathcal{L}_{R_{relit}}$ may be the standard L1 distance between the predicted relit image its ground-truth counterpart, such as the input and output images generated in block 710. The perceptual loss $\mathcal{L}_{P_{relit}}$ may be the layer-wise feature difference between the predicted relit 3D object and the ground-truth relit 3D object extracted by a pretrained VGG to increase the perceptual quality. The adversarial loss $\mathcal{L}_{A_{relit}}$ may be the difference between the predicted relit 3D object and the ground-truth to encourage the generation of high-frequency lighting details. In some examples, a pretrained discriminator (e.g., PatchGAN) with spectral normalization can be used to computer the adversarial loss.

Computing Environment

Figure 8:
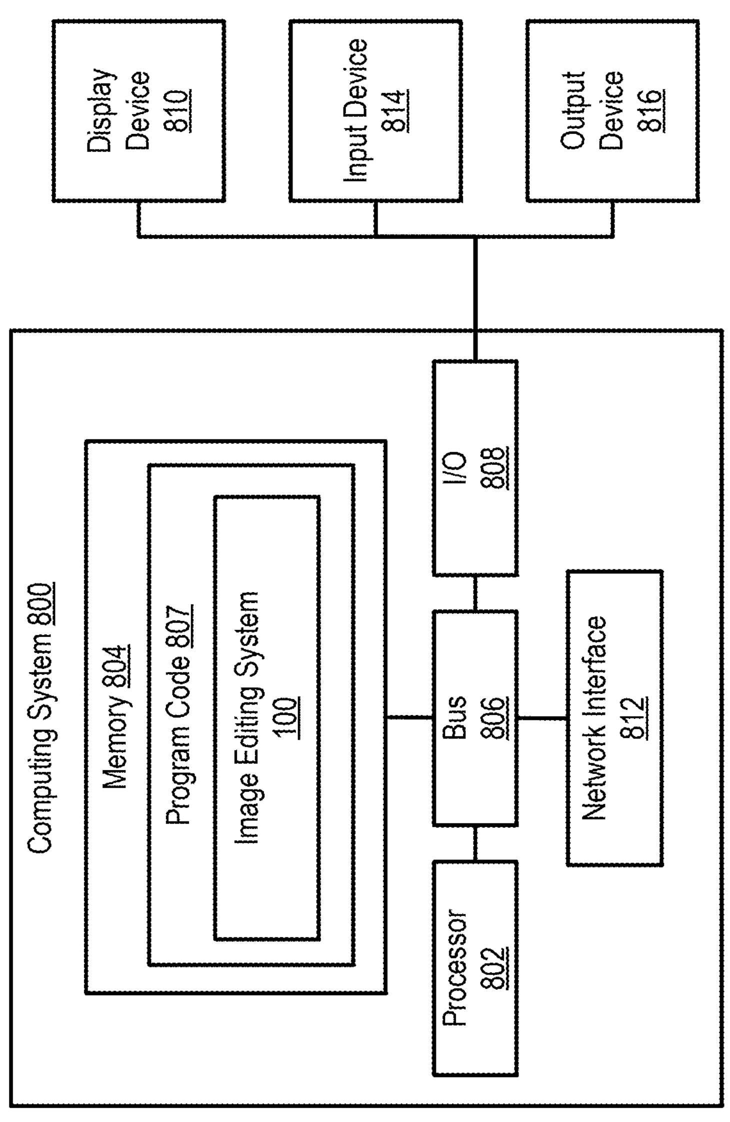
FIG. 8 depicts an example of a computer system that may be suitable for volumetric re-lighting of 3D objects, according to some examples of the present disclosure.

Any suitable computer system or group of computer systems can be used for performing the operations described herein. For example, FIG. 8 depicts an example of a computer system 800. The depicted example of the computer system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing program code 807, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 804 can be volatile memory, non-volatile memory, or a combination thereof.

The computer system 800 executes program code 807 that configures the processor 802 to perform one or more of the operations described herein. Examples of the program code 807 include, in various embodiments, the image editing system 100 of FIG. 1, which may include any other suitable systems or subsystems that perform one or more operations described herein (e.g., one or more ML models, storage systems, controllers, or function-specific modules). The program code 807 may be resident in the memory device 804 or any suitable computer-readable medium and may be executed by the processor 802 or any other suitable processor.

The processor 802 is an integrated circuit device that can execute the program code 807. The program code 807 can be for executing an operating system, an application system or subsystem, or both. When executed by the processor 802, the instructions cause the processor 802 to perform operations of the program code 807. When being executed by the processor 802, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 804 store the program code 807 that includes one or more datasets described herein. In some embodiments, one or more of data sets are stored in the same memory device (e.g., one of the memory devices 804). In additional or alternative embodiments, one or more of the programs, data sets, models, and functions described herein are stored in different memory devices 804 accessible via a data network. One or more buses 806 are also included in the computer system 800. The buses 806 communicatively couple one or more components of a respective one of the computer system 800.

In some embodiments, the computer system 800 also includes a network interface device 812. The network interface device 812 includes any device or group of devices suitable for establishing a wired or wireless data connection to one or more data networks. Non-limiting examples of the network interface device 812 include an Ethernet network adapter, a modem, and/or the like. The computer system 800 is able to communicate with one or more other computing devices via a data network using the network interface device 812.

The computer system 800 may also include a number of external or internal devices, an input device 814, an output device 816, or other input or output devices. For example, the computer system 800 is shown with one or more input/output ("I/O") interfaces 808. An I/O interface 808 can receive input from input devices or provide output to output devices. An input device 814 can include any device or group of devices suitable for receiving visual, auditory, or other suitable input that controls or affects the operations of the processor 802. Non-limiting examples of the input device 814 include a touchscreen, a mouse, a keyboard, a microphone, a separate mobile computing device, etc. An output device 816 can include any device or group of devices suitable for providing visual, auditory, or other suitable sensory output. Non-limiting examples of the output device 816 include a touchscreen, a monitor, a speaker, a separate mobile computing device, etc.

Although FIG. 8 depicts the input device 814 and the output device 816 as being local to the computer system 800, other implementations are possible. For instance, in some embodiments, one or more of the input device 814 and the output device 816 can include a remote client-computing device that communicates with computing system 800 via the network interface device 812 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

GENERAL CONSIDERATIONS

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method performed by one or more processing devices, comprising:

receiving a first image of a three-dimensional ("3D") object;

generating a de-lighted image of the 3D object based on the first image;

generating an embedded representation of the 3D object based on the de-lighted image using a first machine learning ("ML") model;

generating a first representation of the de-lighted image based on the embedded representation using the first ML model;

generating a second representation of the 3D object using a second ML model based on orientation information about the 3D object and lighting information, wherein the second ML model is configured using one or more internal states of the first ML model;

generating a third representation of the 3D object by combining the first representation of the de-lighted image and the second representation of the 3D object; and rendering a second image of the 3D object based on the third representation of the 3D object.

2. The method of claim 1, wherein the first image is a photograph, and the 3D object is a portrait.

3. The method of claim 1, wherein the de-lighted image is an albedo image.

4. The method of claim 3, wherein generating the de-lighted image of the 3D object comprises:

generating a normal image of the 3D object based on the first image using a third ML model; and generating the de-lighted image of the 3D object based on the first image and the normal image using a fourth ML model.

5. The method of claim 4, wherein the third and fourth ML models each comprise a convolutional neural network ("CNN").

6. The method of claim 5, wherein the CNN is based on a U-net architecture.

7. The method of claim 1, wherein:

the first ML model is a generative adversarial network ("GAN"); and generating the embedded representation of the 3D object using the first ML model comprises computing the embedded representation using a GAN inversion operation.

8. The method of claim 7, wherein the one or more internal states of the first ML model comprise one or more features of the GAN.

9. The method of claim 1, wherein the orientation information about the 3D object comprises a rotation of the 3D object.

10. The method of claim 9, wherein the rotation of the 3D object is represented using a rotation matrix.

11. The method of claim 1, wherein the lighting information is represented using an environment map.

12. The method of claim 1, wherein the second ML model comprises a convolution layer, a residual block, and an upsample block.

13. The method of claim 1, wherein the first representation of the de-lighted image, the second representation of the 3D object, and the third representation of the 3D object are tri-planes.

14. The method of claim 1, wherein training the second ML model comprises:

generating a set of training data including a plurality of input training images and corresponding output training images;

generating a de-lighted training image for each training input image of the set of training data;

modifying each de-lighted training image based the corresponding input training image;

training the first ML model using each modified de-lighted training image and corresponding output training image; and training the second ML model using one or more internal states of the trained first ML model.

15. A system comprising:

one or more processors; and one or more computer-readable storage media storing instructions which, when executed by the one or more processors, cause the one or more processors to perform operations including:

receiving a first image of a 3D portrait;

generating a de-lighted image of the 3D portrait based on the first image;

generating an embedded representation of the 3D portrait based on the de-lighted image using a first ML model;

generating a first representation representing the de-lighted image based on the embedded representation using the first ML model;

generating a second representation representing the 3D portrait using a second ML model based on orientation information about the 3D portrait and lighting information, wherein the second ML model is configured using one or more internal states of the first ML model;

generating a third representation representing the 3D portrait by combining the first representation representing the de-lighted image and the second representation representing the 3D portrait; and rendering a second image of the 3D portrait based on the third representation representing the 3D portrait.

16. The system of claim 15, wherein:

the de-lighted image is an albedo image; and generating the de-lighted image of the 3D portrait comprises:

generating a normal image of the 3D portrait based on the first image using a third ML model; and generating the de-lighted image of the 3D portrait based on the first image and the normal image using a fourth ML model.

17. The system of claim 15, wherein:

the first ML model is a generative adversarial network ("GAN");

generating the embedded representation of the 3D portrait using the first ML model comprises computing the embedded representation using a GAN inversion operation; and the one or more internal states of the first ML model comprise one or more features of the GAN.

18. The system of claim 15, wherein the first representation of the de-lighted image, the second representation of the 3D portrait, and the third representation of the 3D portrait are tri-planes.

19. A non-transitory computer-readable medium storing instructions that, when executed by one or more processors, cause the one or more processors to perform operations including:

a step for generating a de-lighted image based on an image of a 3D object;

a step for generating an embedded representation of the 3D object based on the de-lighted image using a first ML model;

a step for generating a first tri-plane representation of the de-lighted image based on the embedded representation using the first ML model;

a step for generating a second tri-plane representation of the 3D object using a second ML model based on orientation information about the 3D object and lighting information, wherein the second ML model is configured using one or more internal states of the first ML model;

a step for generating a third tri-plane representation of the 3D object by combining the first tri-plane representation of the de-lighted image and the second tri-plane representation of the 3D object; and a step for rendering a second image of the 3D object based on the third tri-plane representation of the 3D object.

20. The non-transitory computer-readable medium of claim 19, wherein:

the first ML model is a generative adversarial network ("GAN");

generating the embedded representation of the 3D object using the first ML model comprises computing the embedded representation using a GAN inversion operation; and the one or more internal states of the first ML model comprise one or more features of the GAN.

* * * * *